United States Patent [19]

Fasulo et al.

[11] Patent Number: 5,244,954
[45] Date of Patent: Sep. 14, 1993

[54] MOULDING THERMOPLASTIC COMPOSITIONS ENDOWED WITH IMPROVED MOULD RELEASE CHARACTERISTICS

[75] Inventors: Gian C. Fasulo, Mantova; Francesco Mori, Verona; Dario Ghidoni, Mantova, all of Italy

[73] Assignee: ECP Enichem Polimeri s.r.l., Milan, Italy

[21] Appl. No.: 810,170

[22] Filed: Dec. 19, 1991

[30] Foreign Application Priority Data

Dec. 21, 1990 [IT] Italy .................. 22501 A/90
Nov. 25, 1991 [IT] Italy .............. MI 91 A 003142

[51] Int. Cl.$^5$ .................. C08J 5/10; C08K 5/10; C08L 55/02
[52] U.S. Cl. .................. 534/315; 524/128; 524/147; 524/311; 524/312; 524/314; 524/318; 524/321; 524/322; 525/67; 525/146; 525/439
[58] Field of Search ............ 524/128, 147, 311, 312, 524/314, 315, 318, 321, 322; 525/67, 146, 439

[56] References Cited

U.S. PATENT DOCUMENTS

| | | | |
|---|---|---|---|
| 3,281,381 | 10/1966 | Hechenbleikner et al. | 524/150 |
| 3,310,609 | 3/1967 | Baranauckas et al. | 521/107 |
| 3,717,600 | 2/1973 | Dalhuisen et al. | 524/110 |
| 4,749,745 | 6/1988 | Biglione et al. | 525/146 |
| 4,866,124 | 9/1989 | Biglione et al. | 525/67 |
| 4,902,748 | 2/1990 | Biglione et al. | 525/166 |
| 4,980,417 | 12/1990 | Biglione et al. | 525/125 |

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

Moulding thermoplastic compositions, endowed with improved mould release characteristics, comprising:
A) an impact resistant vinyl aromatic copolymer consisting of an ethylenically unsaturated nitrile, a vinyl aromatic monomer and a rubber;
B) an engineering polymer; and
C) an effective amount of a release agent constituted by a synergistic mixture of an ester of a $C_{16}$–$C_{18}$ acid with glycerol and an ester of a saturated aliphatic $C_{10}$–$C_{20}$ acid with a $C_4$–$C_6$ aliphatic alcohol.

The physical-mechanical properties of the compositions at high moulding temperatures can be improved by addition of an effective amount of a bis(alkyl-phenyl)-pentaerythritol diphosphite.

The compositions can, furthermore, contain in addition a grafted polymer consisting of an elastomeric core having a Tg lower than 10° C. and containing vinyl monomer chains grafted thereon.

23 Claims, No Drawings

MOULDING THERMOPLASTIC COMPOSITIONS ENDOWED WITH IMPROVED MOULD RELEASE CHARACTERISTICS

The present invention relates to moulding thermoplastic compositions with improved mould release characteristics.

More particularly, the present invention relates to moulding thermoplastic compositions endowed with improved mould release characteristics and improved physical-mechanical properties at high moulding temperatures.

Moulding compositions comprising an impact resistant vinyl aromatic copolymer (A), consisting of an ethylenically unsaturated nitrile, a vinyl aromatic monomer and a rubber, and an engineering polymer (B), such as, for example, polycarbonate, are known from Italian Patent No. 1,000,431 and U.S. Pat. Nos. 4,526,926; 4,624,986 and 4,906,689.

Moulding compositions are also known comprising a copolymer (A) of the above defined type, an engineering polymer (B) and a grafted polymer (C) consisting of an elastomeric core having a second order glass transition temperature (Tg) lower than 10° C. and containing vinyl monomer chains grafted thereon.

These compositions are disclosed by European patent application Ser. Nos. 216,065 published on Apr. 1, 1987 and 379,039 published on Jul. 25, 1990 and are employed in numerous technical fields of application because of their optimal combination of mechanical, chemical-physical and termal properties.

A disadvantage of these known compositions is their poor mould release when injection-moulded. This disadvantage, as known, mainly results in the breakage of the moulded article during the extraction phase.

A known way for preventing this disadvantage is to carry out the releasing at high temperatures. This procedure, however, is not without disadvantages mainly due to the sticking of the moulded articles on the mould surface and consequent deformation or breakage of the articles.

In order to improve the mould release of the moulded articles from the mould, a conventional technique is to use releasing agents.

Very often, however, these additives have negative effects on the properties of the thermoplastic compositions. For example, bis(stearyl-/palmitoyl-) ethylene diamine, which is generally used in the ABS resins, improves the flowability of the resin and thereby the processability, but it drastically reduces the heat distortion stability (VICAT). In the case of the compositions of the present invention, this decreasing of the mechanical properties to the heat is an important drawback, which drastically reduces the application field of the compositions.

Releasing agents constituted by long-chain aliphatic carboxylic acid esters of monohydric and trihydric alcohols are also known.

Also these products, however, deteriore the mechanical properties on prolonged heat exposure. Moreover, these products are volatile at the moulding temperature of the composition and this represents a great disadvantage during the processing.

The present invention allows to overcome all the above disadvantages and to provide moulding thermoplastic compositions which have a mould release behavior which is adequate for all technical applications and also show a level of mechanical, physical and thermal properties comparable to those of the compositions which do not contain any mould release agent.

According to the present invention, thermoplastic compositions having the above described characteristics can be obtained by using, as a releasing agent, an effective amount of a synergistic mixture of two esters one of which (i) is an ester of a fatty acid containing from 16 to 18 carbon atoms with glycerol and the other (ii) is an ester of an aliphatic alcohol containing from 4 to 6 hydroxy groups with a saturated, aliphatic monocarboxylic acid containing from 10 to 20 carbon atoms or with a mixture of the above described monocarboxylic acid and a polycarboxylic acid containing from 10 to 20 carbon atoms.

The subject matter of the present invention is, therefore, a moulding thermoplastic composition consisting of:

(A) an impact resistant vinyl aromatic copolymer consisting of an ethylenically unsaturated nitrile, a vinyl aromatic monomer and a rubber;
(B) an engineering polymer; and
(C) an effective amount of a releasing agent constituted by a synergistic mixture consisting of:
  (i) an ester of a fatty acid containing from 16 to 18 carbon atoms with glycerol, and
  (ii) an ester of a saturated, aliphatic, monocarboxylic acid containing from 10 to 20 carbon atoms or a mixture of said monocarboxylic acid and a polycarboxylic acid containing from 10 to 20 carbon atoms with an aliphatic alcohol containing from 4 to 6 hydroxy groups.

When the moulding thermoplastic compositions of the present invention are used in the injection moulding of shaped articles very complex, as far as the dimensions and the criticity of the filling fluxes are concerned, very high temperatures of the mould, generally higher than 260° C., are required for achieving a complete filling of the mould. At such temperature values, the physical-mechanical characteristics of the above mentioned compositions can decay to unacceptable levels.

According to a further aspect of the present invention, the addition of an effective amount of at least a bis(alkyl-phenyl) pentaerythritol diphosphite (D) allows to broaden the temperature range within which the compositions (A) and (B) of the present invention can be moulded and to use mould temperatures higher than 260° C. without any substantial decay of its initial mechanical, physical and thermal properties. The bis(alkyl-phenyl)pentaerythritol diphosphate (D) can be added in an amount comprised between 0 and 3 parts, particularly between 0.01 and 3 parts and preferably between 0.05 and 1 part by weight, with respect to 100 parts by weight of the composition (A)+(B).

The compositions (A)+(B)+(C) and optionally (D) of the present invention can further contain a grafted polymer (E) constituted by an elastomeric core having a glass transition temperature of the second order (Tg) lower than 10° C. and containing vinyl monomer chains grafted thereon, when particular mechanical properties, especially in the welding zone of the injection fluxes, are required.

With respect to 100 parts by weight of the composition (A)+(B), the releasing agent (C) is added in an amount comprised between 0.01 and about 3 parts, preferably from 0.5 to 2 parts by weight.

In the synergistic mixture (C), the ratio between the two esters (i) and (ii) can vary within a Wide range;

particularly advantageous results have been achieved by a weight ratio comprised between 4:1 and 1:4, preferably about 1:1.

The esters (i) of a $C_{16}$–$C_{18}$ fatty acid with glycerol are highly biodegradable products, of non-ionic polar nature and having the following properties:

| | |
|---|---|
| Saponification value | 155–175 mg/g fat |
| Iodine value | 1–2 mg/g fat |
| Monoester content | 40–99% by weight |
| Melting point | 55–65° C. |
| Free glycerol | 1–6% by weight |
| Water content | 0.1–0.5 by weight. |

These esters are well known on the market with the trade mark SOFTENOL ®, produced and sold by HULS TROISDORF AG.-GERMANY; LANKROPLAST ®, produced and sold by LANKRO ITALIANA S.p.A. and LOXIOL ®, produced and sold by HENKEL—GERMANY.

Said esters (i) are proposed as sliding, antistatic, mould release and anti-blocking agents for many plastics materials such as polystyrene, acrylonitrile-butadiene-styrene (ABS), polyethylene, polycarbonate, polypropylene and polyvinyl chloride; tests carried out by the Applicant have, however, shown that their mould release action is very limited where the thermoplastic compositions of the present invention comprising the above-reported components A, B and C are used.

For preparing the esters (ii) of the synergistic mixture D of the present invention, can be used:
alcohols having 4-OH groups and from 4 to 16, preferably from 4 to 8 carbon atoms;
alcohols having 5-OH groups and from 5 to 18, preferably from 5 to 10 carbon atoms;
alcohols having 6-OH groups and from 6 to 18, preferably from 6 to 12 carbon atoms.

The esters (ii) are preferably those which result from the complete esterification of the 4 to 6-OH groups of the alcohols with one or more than one of the $C_{10}$–$C_{20}$ carboxylic acids.

Examples of alcohols containing from 4 to 6-OH groups are: erythritol, arabitol, adonitol, manitol and dulcitol and especially mesoerythritol, xylitol, sorbitol and pentaerythritol.

Any $C_{10}$–$C_{20}$ aliphatic saturated monocarboxylic acid can be used, optionally together with a $C_{10}$–$C_{20}$ polycarboxylic acid, such as, for example, capric acid, undecanoic acid, lauric acid, tridecanoic acid, myristic acid, pentadecanoic acid, palmitic acid, margaric acid, stearic acid, monodecanoic acid, eicosanoic acid, sebacic acid, undecanedioic acid, dodecanedioic acid, brassylic acid, thapsic acid and the like.

Examples of esters (ii) to be used in the synergistic mixture of the present invention are: pentaerythritol tetrastearate, pentaerythritol tetrapalmitate, pentaerythritol tetramyristate, pentaerythritol tetralaurate, mesoerythritol tetralaurate, mesoerythritol tetrastearate, mesoerythritol tetramyristate, mesoerythritol tetraeicosanate, xylitol pentastearate, xylitol pentapalmitate, arabitol pentastearate, arabitol pentapalmitate, sorbitol hexastearate, sorbitol hexapalmitate, dulcitol hexapalmitate, mannitol hexastearate, mannitol hexamyristate and the like.

Esters of stearic acid and those of palmitic acid are used preferentially.

These esters (ii) are prepared according to known processes such as, for example, the process described in "Houben-Weyl Methoden der Organischen Chemie" Georg Thieme Verlag, Stuttgard-1952-4th Edition, Vol. VIII, page 516 et seq.

These esters (ii) are known on the market with the trade mark LOXIOL ®, produced and sold by HENKEL—Dusseldorf-Germany.

German Patent Nos. 2,507,748; 2,701,725 and 2,729,485 disclose the use of these esters (ii) as release agents for high molecular weight aromatic polycarbonates.

Tests carried out by the Applicant have, however, shown that their release action is very poor when the thermoplastic compositions of the present invention comprising the above mentioned components (A) and (B).

The bis (alkyl-phenyl) pentaerythritol diphosphite (D), used in the moulding thermoplastic composition of the present invention, corresponds to the general formula:

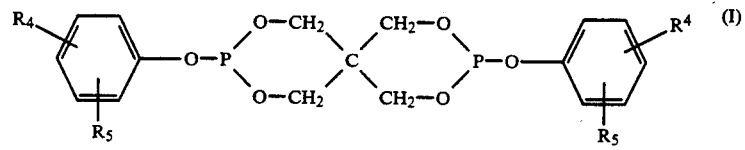

wherein $R_4$ and $R_3$, which can be either equal or different from each other, are alkyl radicals containing from 1 to 10 carbon atoms.

All the above compounds and their preparation are well known in the literature and disclosed in U.S. Pat. Nos. 3,281,381; 3,310,609; 3,192,243 and 3,205,269, the content thereof is integral part of the present description as a reference.

The preferred bis (alkyl-phenyl) pentaerythritol diphosphites are those corresponding to the formula:

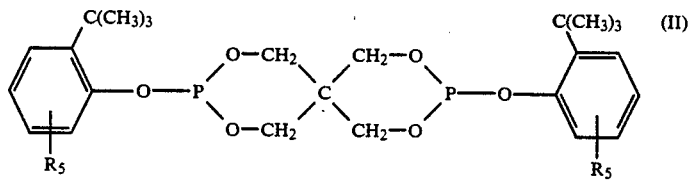

wherein $R_5$ is an alkyl radical containing from 1 to 6 carbon atoms.

A particularly preferred compound is bis (2,4-di-ter butyl-phenyl) pentaerythritol known in the market with the trade name ULTRANOX ® 626 produced and sold by General Electric.

The vinyl aromatic copolymer (A), used in the moulding thermoplastic compositions of the present invention, can be:

(A.1) an impact resistant vinyl aromatic copolymer containing from 2 to 35% by weight of an ethylenically unsaturated nitrile, a dienic rubber in an amount not higher than 20% by weight and a vinyl aromatic monomer; or (A.2) an impact resistant vinyl aromatic copolymer containing from 2 to 35% by weight of an ethylenically unsaturated nitrile, from 5 to 50% by weight of an olefinic elastomer and from 93 to 15% by weight of a vinyl aromatic monomer; the sum of these monomers being equal to 100.

Preferably, the impact-resistant styrene polymer (A.2) comprises from 2 to 35% by weight of an ethylenically unsaturated nitrile, from 15 to 30% by weight of an olefinic elastomer and from 35 to 83% by weight of a vinyl aromatic monomer.

The term vinyl aromatic monomer, whenever used in the present specification and in the claims, comprises the ethylenically unsaturated compounds having the general formula:

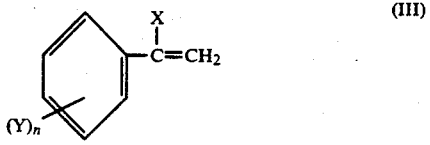

wherein:
X is hydrogen or an alkyl radical having 1 to 4 carbon atoms;
n is O or an integer from 1 to 5 and
Y is a halogen or an alkyl radical having 1 to 4 carbon atoms.

Examples of vinyl aromatic monomers having the above-indicated general formula are: styrene; methyl-styrene; monodi-, tri-, tetra- and penta-chloro-styrene and the corresponding alpha-methyl-styrenes; nucleus-alkylated styrenes and the corresponding alpha-methyl-styrenes such as ortho- and para-methyl-styrenes; ortho- and para-ethyl-styrenes; ortho- and para-methyl-alpha-methyl styrenes, etc.

These monomers can be used individually or in admixture between them or with other copolymerizable comonomers such as, for example maleic anhydride. Styrene is particularly preferred.

By ethylenically unsaturated nitrile, which is copolymerized with the vinyl aromatic monomer, it is meant, at first place and preferably, acrylonitrile; although other ethylenically unsaturated nitrilic monomers such as methacrylonitrile, acrylic acid, methacrylic acid and their alkyl-esters containing from 1 to 6 carbon atoms in the alkyl radical can be advantageously used.

The dienic rubbers used in the copolymer (A.1) for making it impact resistant are: poly-butadiene, poly-isoprene, the copolymers of butadiene and/or isoprene, with styrene or with other monomers; polybutadiene is preferred.

The content of said dienic rubber in the impact resistant vinyl aromatic copolymer is not higher than 20% by weight and preferably comprised between 2 and 15% by weight.

In the impact resistant vinyl aromatic copolymer (A.2), the elastomeric olefinic component, which is the substrate on which the ethylenically unsaturated nitrile and the vinyl aromatic monomer are in part grafted and in part mechanically adhered in the form of an ethylenically unsaturated nitrile-vinyl aromatic monomer copolymer, is a rubber-like copolymer, having a Mooney viscosity ranging from 10 to 150 ML-4 at 100° C., of at least two different straight chain alpha-monoolefins such as ethylene, propylene, butene-1, octene-1 and the like, with at least another copolymerizable monomer, generally a polyene and typically a non-conjugated diene. Preferably one of the alpha-monoolefins is ethylene along with another alpha-monoolefin having a longer chain. The ethylene to the other alpha-monoolefin weight ratio in the rubber-like copolymer is usually in the range from 20/80 to 80/20. Particularly preferred copolymers are the ethylene-propylene-non-conjugated diene terpolymers wherein the non-conjugated diene may be cyclic or acyclic such as: 5-methylene-2-norbornene; 5-ethylidene-2-norbornene; 5-isopropylene-2-norbornene; pentadiene-1,4; hexadiene-1,4; hexadiene-1,5; heptadiene-1,5; dodecatriene-1,7,9; methyl-heptadiene-1,5; norbornadiene-2,5; cyclooctadiene-1,5; dicyclopentadiene; tetrahydroindene; 5-methyl-tetrahydroindene, etc. The diene content ranges approximately from 5 to 20% by weight and preferably from 8 to 18% by weight of dienic monomeric units in the rubber-like terpolymer.

Particularly, a rubber-like ethylene-propylene-non conjugated diene having a Mooney viscosity (ML-4), measured at 100° C., ranging from 30 to 90 and an iodine number higher than 5, preferably ranging from 10 to 40, is preferred.

The impact resistant vinyl aromatic copolymers (A.1) and (A.2) can be obtained according to any known polymerization process in suspension, bulk-suspension or continuous bulk, with the proviso that the above mentioned compounds are used as starting monomers.

When the impact resistant vinyl aromatic copolymer (A.1) is obtained according to an emulsion polymerization process, the dienic rubber can be also higher than 20% and up to 65% by weight, with an ethylenically unsaturated nitrile content ranging from 2 to 35% by weight.

The engineering polymer (B) used in the composition of the present invention can be any plastics material having mechanical, chemical and thermal properties suitable for use as a construction material.

A detailed description of the term "engineering polymer" can be found in "Engineered Materials Handbook" Vol. 2-Engineering Plastics-ASM Intern;. 1988.

Typical examples of suitable engineering polymers are: polycarbonate, polyesters, thermoplastic polyurethanes, polymethacrylates, styrene-methylmethacrylate copolymers, acrylic polymers, styrene-maleic anhydride copolymers, vinyl chloride polymers and the like; the aromatic polycarbonate is preferred.

The aromatic polycarbonate is preferably obtained by a bisphenol having the formula:

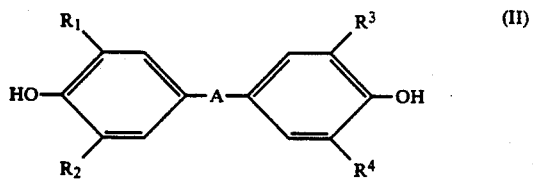

in which each of $R_1$, $R_2$, $R_3$ and $R_4$ represents hydrogen or an alkyl radical containing from 1 to 4 carbon atoms or a halogen, and A represents —O—, —CO—, —SO$_2$—, an alkylene radical containing 2 to 10 carbon atoms, an alkylidene radical containing from 2 to 10 carbon atoms, a cycloalkylene radical containing from 5 to 15 carbon atoms, a cycloalkylidene radical containing from 5 to 15 carbon atoms or the radical:

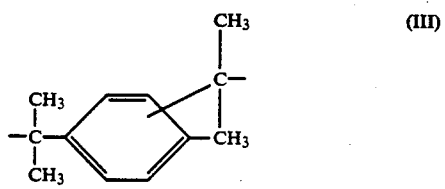

Particularly preferred bisphenols are, for example, 2,2-bis-(4-hydroxyphenyl)-propane; 2,2-bis-(3,5-dimethyl-4-hydroxyphenyl)propane; 2,2-bis-(3,5-dichloro-4-hydroxyphenyl)-propane; 2,2-bis-(3,5-dibromo-4-hydroxyphenyl)-propane and 1,1-bis-(4-hydroxyphenyl)-cyclohexane.

Particularly preferred polycarbonates are the ones based on one or more of the above-mentioned bisphenols. In particular, the polycarbonates based on 2,2-bis-(4-hydroxyphenyl)-propane or on 2,2-bis-(3,5-dimethyl-4-hydrophenyl)-propane alone or in admixture with one another or with one of the above-indicated bisphenols are preferred.

The aromatic polycarbonates have an average molecular weight of at least 10,000, more particularly from 10,000 to 200,000 and preferably from 20,000 to 80,000, as determined by measuring the relative viscosity in CH$_2$Cl$_2$ at 25° C. and at a concentration of 0.5% by weight.

The aromatic polycarbonates are well known in the art and are available on the market from several manufacturers, for example: General Electric Company, Pittsfield, Mass., USA, under the trademark "LEXAN ®"; ENIMONT—Milan, under the trademark "SINVET ®"; Proquigel (Brazil), under the trademark "DUROLON ®", etc.

In the compositions of the present invention, the amounts of the vinyl aromatic polymer (A) and of the engineering polymer (B) can vary within a wide range.

Generally, the vinyl aromatic polymer (A) is comprised between 10 and 90% by weight, preferably between 20 and 80% by weight; and, correspondingly, the engineering polymer (B) is comprised between 90 and 10% by weight, preferably between 80 and 20% by weight.

The compositions of the present invention can also comprise in addition a grafted polymer (E) consisting of an elastomeric core having a second order glass transition temperature lower than 10° C. and containing vinyl monomer chains grafted thereon, especially when high mechanical characteristics in the joint points of the injection fluxes are required.

The amount of said grafted polymer (E) can be from 0 to 30 parts, preferably from 2 to 15 parts with respect to 100 parts by weight of the blend (A)+(B).

Said grafted polymer (E) is a polymer of the "core-shell" type comprising an elastomeric core containing, grafted thereon, chains of vinyl monomers.

Preferably, the "core-shell" polymer comprises from approximatively 25 to approximatively 95% by weight of elastomeric core and correspondingly, from about 75 to about 5% by weight of vinyl monomer chains grafted thereon.

The elastomeric core has a second order glass transition temperature lower than 10° C. and may be polybutadiene, copolymers of butadiene with styrene, isoprene and/or with acrylonitrile, wherein the butadiene content is higher than 40% by moles, or acrylic rubbers.

The vinyl monomers which are grafted on the elastomeric core can be acrylic acid derivatives or methacrylic acid derivatives, vinyl-aromatic compounds, vinyl-cyanide compounds and polyfunctional derivatives, either individually or in admixture with each other. Specific examples of these grafted vinyl monomers comprise methacrylic acid alkyl esters, in which the alkyl radical contains from 1 to 16 carbon atoms, preferably methyl methacrylate; esters of methacrylic acid with polyfunctional alcohols such as 1,3-butylenglycol dimethacrylate and trimethylol-propane-trimethacrylate; allyl methacrylate and/or diallyl methacrylate; vinyl-aromatic compounds such as styrene, vinyl toluene, alpha-methyl styrene, halogenated styrene; vinyl naphthene or di-vinyl benzene; styrene being particularly preferred; vinyl cyanide compounds such as acrylonitrile, methacrylonitrile, alpha-halogenated acrylonitriles; acrylonitrile being particularly preferred; maleic acid and anhydride.

These vinyl monomers can be used individually or in admixture thereof.

The elastomeric core of the grafted copolymer (E), used in the compositions of the present invention, has preferably a second order transition temperature lower than −10° C. and even lower than −50° C. and a cross-linking degree higher than 50% and up to 99% by weight (gel content), determined by extraction.

The grafted copolymer used in the compositions of the present invention has preferably an elastomer content higher than 35% and up to 95% by weight.

These copolymers can be prepared by means of any known method such as bulk polymerization, suspension polymerization, bulk-suspension polymerization, solution polymerization or emulsion polymerization.

A typical example of grafted polymer (E) to be used in the subject composition can be a three-step polymer having a rubber-like core based on butadiene, a second step polymerized from styrene and a final step, or shell, polymerized from methyl-methacrylate and 1,3-butylene-glycol-dimethacrylate.

The grafted polymer (E) is well known on the market and is available from a great number of manufactures such as, for example, from Rohm and Haas Company, Philadelphia, USA, under the trade-name PARALOID ® EXL 2600, EXL 2300, EXL 3600 and EXL 3300 or from Kanega, Belgium, under the trade-name KaneAce ® M 511, etc.

Examples of preferred moulding thermoplastic compositions are those consisting of a blend constituted by 20 to 60% by weight of (A.1) or (A.2) and from 80 to 40% by weight of an aromatic polycarbonate, and, with respect to 100 parts by weight of this blend, from 0.1 to 1 part by weight of a bis (alkyl-phenyl) disphosphite (D), from 0.5 to 2 parts by weight of the releasing synergistic mixture (C) and from 0 to 15 parts by weight of a grafted polymer (E).

The compositions subject matter of the present invention can be prepared by any known conventional mixing method.

Generally, the mixing is carried out in the melt state, previous a premixing at room temperature, in known mixing units such as single-screw or two-screw extruders, Banbury mixers, mixing rolls etc. at a temperature ranging from 180° to 300° C.

The compositions may further contain other additives intimately incorporated therein, such as plasticizers, lubricants, fireproofing agents, antistatic agents, dyes, pigments, glass fibres or other inorganic fillers etc., in order to impart particular characteristics to the material.

The compositions of the present invention are easy to be processed and exhibit a complex of properties which make them suited to be utilized for producing articles endowed with a high tenacity along with a high impact strength. The fields of use of said compositions are therefore the sectors of the household electric apparatus, of electronics and technical articles in general in the form of films, sheets, strips, bands, rods, boxes, pans, containers and the like. The compositions can be used to produce foamed articles by means of conventional techniques.

For a better understanding of the present invention and to reduce it to practice, a few illustrative, but not limitative examples are given hereinafter.

In the examples, all parts and percentages are expressed by weight, unless otherwise indicated.

In the examples, for measuring the characteristics of the compositions of the present invention, the following methods were used.

Mechanical Properties

The IZOD resiliences with notch at 23° C. and at −30° C., according to standard ASTM D 256, on test pieces having a thickness of 3.2 mm, and the break elongation in tensile stress tests, according to standard ASTM D 638, were determined.

Thermal Properties

The VICAT B softening temperature (5 kg in oil) was determined according to standard ISO 306, with a temperature increasing of 120° C./hour.

Rheological Properties

The Melt-index (M.F.I.) was determined according to standard ASTM D 1238, at 260° C. and 5 kg.

Release Force

The force required for drawing, at the temperature of the mould of 50°-60° C., a box having the dimensions 220×110×70 mm. and a thickness of 2 mm. from the relevant mould assembled on a NEGRI & BOSSI press was determined, by using a pressure transducer inserted in the oleodynamic circuit of the ejector and by recording the value on an oscilloscope mod. HP 54201 D.

EXAMPLES 1 TO 4

In a rotating drum mixer, the following components were blended, at room temperature:

29.5 parts by weight of an impact resistant vinyl aromatic copolymer consisting of 68.5% by weight of styrene, 9.5% by weight of polybutadienic rubber and 22% by weight of acrylonitrile;

8.6 parts by weight of PARALOID® EXL 2600 rubber consisting of 60% by weight of a polybutadiene rubber core on which chains of styrene-methylmethacrylate copolymer (1:1 ratio) in an amount of 40% were grafted;

70.5 parts by weight of SINVET® aromatic polycarbonate produced and sold by ENIMONT S.p.A. and a release agent of the type and in the amounts reported in the following Table I.

The thus obtained mixture was dryed at 100° C. for 4 hours and extruded by a mono-screw extruded BANDERA TR 45, with a length/diameter ratio of 25, under degassing, at a temperature of 260° C.

By cutting the strands leaving the extruder, granules were obtained, which were dried for 4 hours at 100° C.

In order to evaluate the characteristics, the granules were injection molded at a temperature of 260°-270° C. in a press NEGRI & BOSSI V 17-110 FA to obtain test pieces having the dimensions required by the standards.

The properties measured on the test pieces thus obtained are recorded in the following Table I.

TABLE I

| RELEASE AGENT | UNITS | EXAMPLES | | | |
| --- | --- | --- | --- | --- | --- |
| | | 1* | 2* | 3* | 4 |
| Glycerol monostearate | % by weight | — | 1,0 | — | 0,5 |
| Pentaerythritol tetra-stearate | | — | — | 1,0 | 0,5 |
| PROPERTIES | | | | | |
| IZOD | J/m | 670 | 660 | 680 | 650 |
| VICAT | °C. | 131 | 125 | 132 | 130 |
| MELT INDEX | g/10' | 14,3 | 14,4 | 14,5 | 14,5 |
| RELEASE FORCE | KN | 3,80 | 3,23 | 3,70 | 2,50 |

*Comparison examples

EXAMPLE 5

The process modalities of example 1 were repeated for preparing a composition comprising:

40.2 parts by weight of a vinyl aromatic copolymer consisting of 65% by weight of styrene, 11% by weight of polybutadiene rubber and 24% by weight of acrylonitrile, prepared by bulk polymerization in the presence of Trigonox®25 B 50 of AKZO, as initiator;

59.8 parts by weight of an aromatic polycarbonate SINVET® produced and sold by ENIMONT S.p.A.;

8.6 parts by weight of rubber PARALOID® EXL 2600 of example 1;

1 part by weight of a mixture constituted by glycerol monostearate and pentaerythritol tetrastearate, in the weight ratio 1:1.

The mechanical, thermal and rheological properties and the release force, measured according to the methods reported in example 1, are:
IZOD: 580 J/m
VICAT: 121° C.
Melt Index: 16 g/10'
Release force: 2,3 KN

EXAMPLES 6 TO 10

In a rotating drum mixer, the following components were blended, at room temperature:

an impact resistant vinyl aromatic copolymer (A) consisting of 67.5% by weight of styrene, 10.5% by weight of polybutadienic rubber and 22% by weight of acrylonitrile, in the amount listed in the following Table II;

SINVET ® aromatic polycarbonate (B) produced and sold by ENICHEM, in the amount listed in the following Table II;

a releasing agent (C) of the type and in the amounts reported in the following Table II;

bis-(2,4-di-ter. butyl-phenyl)-pentaerythritol-diphosphite (ULTRANOX ® 626) (D), in the amount listed in the following Table II;

PARALOID ® EXL 2600 rubber (E) consisting of 60% by weight of a polybutadiene rubber core on which chains of styrene-methylmethacrylate copolymer (1:1 ratio) in an amount of 40% are grafted; in the amount listed in the following Table II.

The thus obtained mixture was dryed at 100° C. for 4 hours and extruded by a mono-screw extruder BANDERA TR 45, with a length/diameter ratio of 25, under degassing, at a temperature of 260° C.

By cutting the strands leaving the extruder, granules were obtained, which were dried for 4 hours at 100° C.

In order to evaluate the characteristics, a portion of the granules were injection molded at a temperature of 260°–270° C. in a press NEGRI & BOSSI V 17-110 FA to obtain test pieces having the dimensions required by the standards. Another portion of the granules were injection molded at a temperature of 300°–310° C. in the same NEGRI & BOSSI V 17-110 FA press.

The properties measured on the test pieces thus obtained are recorded in the following Table III.

TABLE II

| COMPOSITION | | EXAMPLES | | | | |
|---|---|---|---|---|---|---|
| | | 6 | 7 | 8 | 9 | 10 |
| A) Vinyl aromatic copolymer | Parts | 32 | 32 | 42 | 42 | 30 |
| B) SINVET ® | by | 68 | 68 | 58 | 58 | 70 |
| C) Releasing agent | weight | | | | | |
| Glycerol monostearate | | 0,4 | 0,4 | 0,4 | 0,4 | 0,4 |
| Pentaerythritol tetrastearate | | 0,6 | 0,6 | 0,6 | 0,6 | 0,6 |
| D) ULTRANOX ® 626 | | — | 0,3 | — | 0,3 | 0,3 |
| E) PARALOID ® EXL 2600 | | 5,5 | 5,5 | 5,5 | 5,5 | — |

TABLE III

| PROPERTIES | MOULDING TEMPERATURE °C. | UNITS | EXAMPLES | | | | |
|---|---|---|---|---|---|---|---|
| | | | 6 | 7 | 8 | 9 | 10 |
| IZOD at +23° C. | 260–270 | J/m | 610 | 650 | 510 | 530 | 600 |
| | 300–310 | J/m | 150 | 350 | 110 | 320 | 320 |
| IZOD at −30° C. | 260–270 | J/m | 310 | 340 | 280 | 300 | 320 |
| | 300–310 | J/m | 100 | 250 | 80 | 215 | 230 |
| ELONGATION AT BREAK | 260–270 | % | 110 | 120 | 110 | 120 | 115 |
| | 300–310 | % | 60 | 100 | 68 | 115 | 80 |
| VICAT | 260–270 | °C. | 130 | 130 | 121 | 121 | 132 |
| M.F.I. | | g/10 min. | 14,5 | 14 | 15,5 | 15,5 | 16 |
| RELEASE FORCE | 260–270 | KN | 2,5 | 2,3 | 2,3 | 2,2 | 2,4 |

We claim:

1. Moulding thermoplastic compositions, having improved mould release characteristics, comprising:
    (A) an impact resistant vinyl aromatic copolymer containing an ethylenically unsaturated nitrile, a vinyl aromatic monomer and a rubber;
    (B) an engineering polymer;
    (C) an effective amount of a releasing agent constituted by a synergistic mixture consisting of:
        (i) an ester of a fatty acid containing from 16 to 18 carbon atoms with glycerol and
        (ii) an ester of a saturated, aliphatic, monocarboxylic acid containing from 10 to 20 carbon atoms or a mixture of said monocarboxylic acid and a polycarboxylic acid containing from 10 to 20 carbon atoms, with an aliphatic alcohol containing from 4 to 6 oxydrilic groups;
    (D) from 0 to 3 parts by weight with respect to 100 parts by weight of the components (A)+(B) of a bis(alkyl-phenyl) pentaerythritol diphosphite, and, optionally,
    (E) a grafted polymer constituted by an elastomeric core having a second order glass transition temperature lower than 10° C., and containing vinyl monomer chains grafted thereon.

2. Moulding thermoplastic compositions according to claim 1, wherein the weight ratio between the two esters (i) and (ii) of the synergistic mixture (C) is comprised between 4:1 and 1:4, preferably about 1:1.

3. Moulding thermoplastic compositions according to claim 1 or 2, wherein the ester (i) of a $C_{16}$–$C_{18}$ fatty acid with glycerol is a biodegradable product, of non-ionic polar nature, having the following properties:
Saponification value: 155–175 mg/g fat
Iodine value: 1–2 mg/g fat
Monoester content: 40–99% by weight
Melting point: 55°–65° C.
Free glycerol: 1–6% by weight
Water content: 0.1–0.5% by weight.

4. Moulding thermoplastic compositions according to claim 1, wherein the ester (ii) of the synergistic mixture (C) is obtained from a saturated, aliphatic, monocarboxylic acid containing from 10 to 20 carbon atoms or from a mixture of the monocarboxylic acid and a polycarboxylic acid containing from 10 to 20 carbon atoms with an aliphatic alcohol selected from the group consisting of:
    alcohols having 4 OH groups and from 4 to 16, preferably from 4 to 8 carbon atoms;
    alcohols having 5 OH groups and from 5 to 18, preferably from 5 to 10 carbon atoms;
    alcohols having 6 OH groups and from 6 to 18, preferably from 6 to 12 carbon atoms.

5. Moulding thermoplastic compositions according to claim 4, wherein the ester (ii) of the synergistic mixture (C) is obtained by the complete esterification of the 4 to 6 OH groups of the alcohols with one or more than one of the $C_{10}$–$C_{20}$ carboxylic acids.

6. Moulding thermoplastic compositions according to claim 1, wherein the $C_{10}$–$C_{20}$ carboxylic acid is stearic acid or palmitic acid.

7. Moulding thermoplastic compositions according to claim 1, wherein the amount of the releasing agent (C) is comprised between 0.01 and 3 parts by weight, preferably from 0.5 to 2 parts by weight, with respect to 100 parts of the components (A)+(B).

8. Moulding thermoplastic compositions according to claim 1, wherein the bis(alkyl-phenyl)pentaerythritol diphosphite has general formula

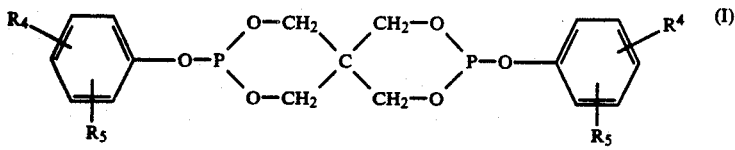

wherein $R_4$ and $R_5$, which can be either equal to or different from each other, are alkyl radical containing from 1 to 10 carbon atoms.

9. Moulding thermoplastic compositions according to claim 8, wherein the bis(alkyl-phenyl) pentaerythritol di-phosphite has general formula:

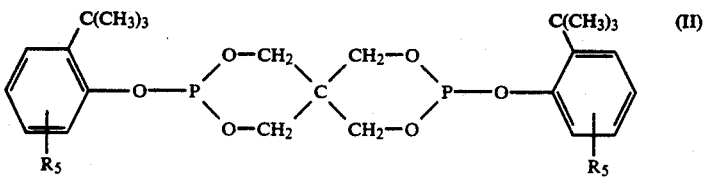

wherein $R_5$ is an alkyl radical containing from 1 to 6 carbon atoms.

10. Moulding thermoplastic compositions according to claim 8 or 9, wherein the bis(alkyl-phenyl)pentaerythritol disphosphite is bis(2,4-di-ter. butyl-phenyl)-pentaerythritol diphosphite.

11. Moulding thermoplastic compositions according to claim 8, wherein the amount of bis(alkyl-phenyl)pentaerythritol diphosphite is comprised between 0.01 and 3 parts by weight with respect to 100 parts by weight of (A)+(B).

12. Moulding thermoplastic compositions according to claim 11, wherein the amount of bis(alkyl-phenyl)-pentaerythritol diphosphite is comprised between 0.05 and 1 part by weight, with respect to 100 parts by weight of (A)+(B).

13. Moulding thermoplastic compositions according to claim 1, wherein component (A) is selected from:
an impact resistant vinyl aromatic copolymer (A.1) containing from 2 to 35% by weight of an ethylenically unsaturated nitrile, a dienic rubber in an amount not higher than 20%, preferably comprised between 2 and 15% by weight, and a vinyl aromatic monomer;
an impact resistant vinyl aromatic copolymer containing from 2 to 35% by weight of an ethylenically unsaturated nitrile, a dienic rubber in an amount higher than 20% and up to 65% by weight and a vinyl aromatic monomer; and
an impact resistant styrene copolymer (A.2) containing from 2 to 35% by weight of an ethylenically unsaturated nitrile, from 5 to 50%, preferably from 15 to 30%, by weight of an olefinic elastomer; and from 93 to 15%, preferably from 83 to 35%, by weight of a vinyl aromatic monomer; the sum of these monomers being equal to 100.

14. Moulding thermoplastic compositions according to claim 13, wherein the ethylenically unsaturated nitrile is acrylonitrile.

15. Moulding thermoplastic compositions according to claim 13, wherein the vinyl aromatic monomer is styrene.

16. Moulding thermoplastic compositions according to claim 13, wherein the dienic rubber is polybutadiene and the olefinic elastomer is an ethylene-propylene-non-conjugated diene rubber terpolymer having a Moonay viscosity (ML-4), at 100° C., comprised between 30 and 90 and an iodine number higher than 5, preferably ranging from 10 to 40.

17. Moulding thermoplastic compositions according to claim 1, wherein the engineering polymer (B) is polycarbonate.

18. Moulding thermoplastic compositions according to claim 1, wherein the vinyl aromatic polymer (A) is comprised between 10 and 90%, preferably between 20 AND 80% by weight; and correspondingly, the engineering polymer (B) is comprised between 90 and 10%, preferably between 80 and 20% by weight.

19. Moulding thermoplastic compositions according to claim 1, wherein the amount of the grafted polymer (E) is comprised between 0 and 30, preferably between 2 and 15, parts with respect to 100 parts by weight of the blend (A)+(B).

20. Moulding thermoplastic compositions according to claim 1, wherein the grafted polymer (E) is of core-shell type comprising from 25 to 95% by weight of elastomeric core and from 75 to 5% by weight of grafted vinyl monomer chains.

21. Moulding thermoplastic compositions according to claim 20, wherein the core has a second order transition temperature lower than 10° C. and is selected from polybutadiene, copolymers of butadiene with styrene, isoprene and/or with acrylonitrile in which the butadiene content is higher than 40% by moles, and acrylic rubbers.

22. Moulding thermoplastic compositions according to anyone of the preceding claims 20 and 21, wherein the vinyl monomers are selected from derivatives of acrylic acid, derivatives of methacrylic acid, vinyl-aromatic compounds, vinyl-cyanide compounds, poly-functional derivatives and mixtures thereof.

23. Moulding thermoplastic compositions according to claim 1, consisting of a blend constituted by from 20 to 60% by weight of a vinyl aromatic copolymer (A.1) or (A.2) and from 80 to 40% by weight of an aromatic polycarbonate and, with respect to 100 parts by weight of the above blend, from 0.1 to 1 part by weight of a bis (alkyl-phenyl) diphosphite (D), from 0.5 to 2 parts by weight of the releasing synergistic mixture (C) and from 0 to 15 parts of a grafted polymer (E).

* * * * *